Figure 4:
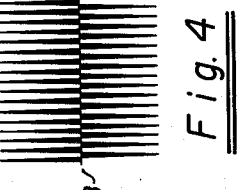

May 26, 1959  F. A. NELSON ET AL  2,888,638

GYROMAGNETIC RESONANCE PROCESS ANALYSIS AND CONTROL

Filed June 4, 1956

INVENTORS
Forrest A. Nelson &
BY    Martin E. Packard

Attorney

United States Patent Office 2,888,638
Patented May 26, 1959

2,888,638

GYROMAGNETIC RESONANCE PROCESS ANALYSIS AND CONTROL

Forrest A. Nelson, Palo Alto, and Martin E. Packard, Menlo Park, Calif., assignors to Varian Associates, San Carlos, Calif., a corporation of California Application June 4, 1956, Serial No. 589,258

11 Claims. (Cl. 324—.5)

This invention relates in general to gyromagnetic resonance techniques and more particularly to a novel automatic chemical process analysis and control system utilizing gyromagnetic resonance spectroscopy.

It is desirable in many instances to chemically analyze the substance in a chemical process and to control the process in accordance with the analysis obtained in an automatic, unattended manner. The present invention discloses an automatic process control system in which a chemical substance is analyzed by gyromagnetic resonance and the relative proportions of a plurality of distinct atom portions such as nuclei in the chemical substance are determined. The chemical analysis and control operates continuously provided that the flow of chemical substance is not interrupted or that the desired relative proportions of the plurality of nuclei in the substance do not change beyond certain predetermined limits. However, should the chemical substance cease to flow or should the relative proportions change beyond their predetermined limits, an alarm will be sounded to indicate the failure in the process. A continuous recording indicating the conformance to the proper ratio is obtained, the recording indicating deviations from the desired ratios. A novel technique is utilized to prevent the gyromagnetic resonance spectrum from drifting, this system employing an automatic feedback system for maintaining the gyromagnetic resonance signal centered.

It is, therefore, the object of the present invention to provide a novel method and apparatus utilizing the principle of gyromagnetic resonance for automatically analyzing the substance of and controlling, in accordance with the analysis, a chemical process.

One feature of the present invention is the provision of a novel system utilizing a gyromagnetic resonance means for analyzing a plurality of different atom portions, such as nuclei separated by a chemical shift, in a chemical substance whereby the ratios of the different atom portions may be determined.

Another feature of the present invention is the provision of a novel system as set forth above wherein means are provided for sounding an alarm or render other signals should the relative proportions of the atom portions in the flowing substance extend beyond predetermined limits.

Still another feature of the present invention is the provision of a novel method and apparatus for utilization in gyromagnetic resonance spectroscopy for automatically controlling the system so that any tendency for the resonance signal to drift is automatically compensated for and the signal maintained in a constantly centered position.

Figure 1:
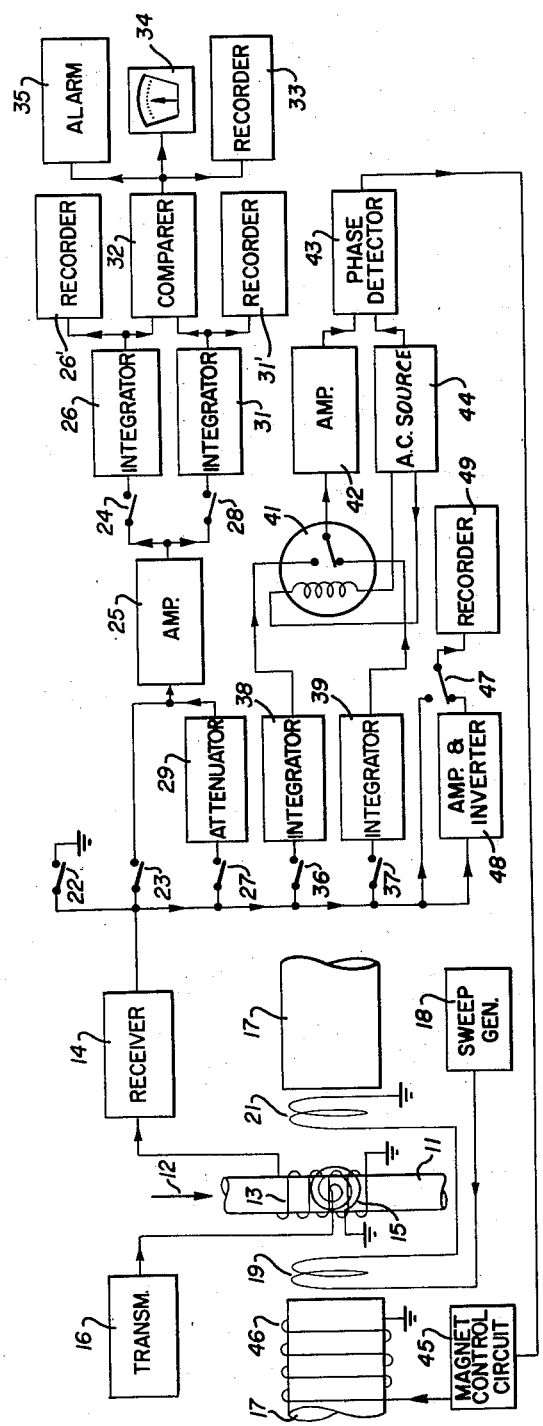
Figure 3:
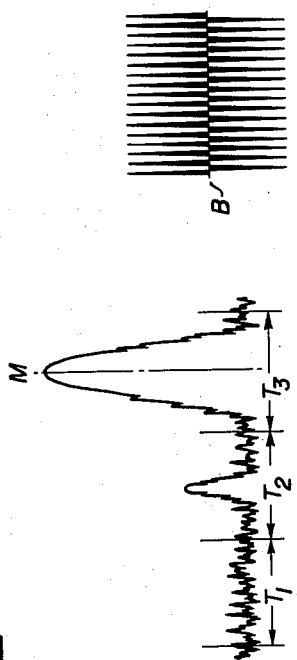
Figure 2:
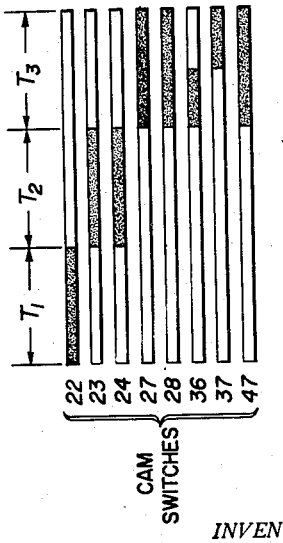

These and other features and advantage of the present invention will become more apparent upon a perusal of the following specification taken in connection with the accompanying drawings wherein, Fig. 1 is a schematic block diagram which discloses one embodiment of the present invention, Fig. 2 is a graph showing the time sequence of operation of the cam controlled switches utilized in the block diagram system of Fig. 1, Fig. 3 is a trace of a typical gyromagnetic resonance signal obtained during an analysis of a mixture of benzene ($C_6H_6$) and hexane ($C_6H_{14}$), the ratio of the benzene hydrogen nuclei to the hexane hydrogen nuclei being about 10% to 90%, and Fig. 4 discloses a continuous trace of the gyromagnetic resonance signals shown in Fig. 3 after the first resonance peaks of the signals have been transmitted through an amplifier such that the amplitude of the first peak is increased to approximately the same amplitude as the second resonance peak and so that the first peak has been inverted whereby a relative comparison between the two peaks may be more easily made.

Referring now to Fig. 1 there is shown a conduit 11, as of glass, through which the chemical substance in a process may easily flow, for example, in the direction of the arrow 12. Encircling this glass conduit 11 is a receiver coil 13 which is coupled to the input of a receiver system 14. Positioned perpendicular to this receiver coil 13 is a transmitter coil 15 which is coupled to the output of a transmitter section 16. The receiver and transmitter coils are positioned in a uniform magnetic field produced, for example, by a permanent or electromagnet 17, the direction of the magnet's field being perpendicular to both the receiver and transmitter coils.

Persons skilled in the art will immediately recognize this familiar nuclear resonance spectroscopy apparatus. The chemical substance to be analyzed flows through the conduit 11 and the nuclei therein to be investigated are polarized in the unidirectional magnetic field produced by the magnet 17. A radio frequency energy is supplied to the transmitter coil 15 from the transmitter section 16 at a radio frequency which is substantially equal to the Larmor precession frequency of the nuclei in the unidirectional magnetic field. The nuclei in the chemical substance are therefore made to precess, in the unidirectional magnetic field, in resonance with the radio frequency magnetic field applied thereto from the transmitter coil 15 and to induce, by means of their precessing magnetic moments, a radio frequency voltage in the receiver coil 13. A sweep generator 18 is coupled to sweep coils 19 and 21 for providing an audio sweep of the polarizing magnetic field so that the region of resonance may be periodically swept through or scanned in well-known manner. Although in the present instance a sweep of the polarizing magnetic field is employed, one may also periodically sweep the radio frequency of the transmitter while maintaining the polarizing field fixed. This technique of gyromagnetic resonance is more fully described in United States Patent Re. 23,950 entitled "Method and Means for Chemical Analysis by Nuclear Inductions" issued to Bloch et al. on February 22, 1955.

In describing this particular invention it will be assumed that the chemical substance under investigation is a mixture of benzene and hexane and that the nuclear resonance signal obtained therefrom is made up of two resonance peaks, one due to the benzene hydrogen nuclei and the other due to the hexane hydrogen nuclei, these resonance peaks being separated due to a chemical shift. It should be understood that this particular substance is chosen only for illustration purposes and that other substances may be analyzed by nuclear resonance or electron resonance. It is also assumed that in this process it is imperative that the proportion of the benzene nuclei to the hexane nuclei be always maintained at approximately 10% to 90%, and that any deviation in this percentage is a defect in the process and must be indicated by a suitable alarm.

It is also necessary in this system that a continual free running recorder or recorders be provided so that a constant record may be kept.

The electronic system used to accomplish the purpose of this process control is constructed and operates as follows. The gyromagnetic resonance output signal from the receiver 14 is coupled to three separate circuits or branches, one branch being an alarm system which measures the ratio of the benzene hydrogen nuclei to the hexane hydrogen nuclei, records the ratio and sounds an alarm if the ratio varies; the second branch serving to integrate each half of the resonance peak of the hexane hydrogen nuclei and to use this integration to automatically control the operation of the nuclear resonance spectrometer to maintain the signal independent of drifts due to variations in the uniform magnetic field and the like which would tend to destroy the time synchronization between the resonance signal and the different time periods; and the third branch including an inverter and amplifier circuit coupled to a recorder utilized to make a permanent, continuous record of the two resonance peaks wherein one of the resonance peaks is inverted so that the two different resonance peaks are recorded on the two different sides of a base line.

The operation of the control system is divided into three time periods, the first time period $T_1$ occuring during a period just preceding the first resonance peak, this first time period being utilized to clamp the output of the receiver to a predetermined base line, in this case ground potential. The second time period $T_2$ corresponds to the period when the first resonance peak is being produced and the third time period $T_3$ corresponds to the time when the second resonance peak is produced. These three time periods are accurately determined by cam operated switches controlled by a clock motor (not shown) which also drives the sweep generator 18 and thus insures that the sweep is synchronized with the cam operated switches. The sequence of operation of the switches is set forth in the time bar chart of Fig. 2 where it is noted that cam switch 22 closes during the first time interval, the period of operaiton of the switches being represented by the darkened bars. On operation of this switch, ground is closed to the output of the receiver 14, this ground serving in combination with a capacitor (not shown) coupled in the output of the receiver to clamp the resonance signal output of the receiver 14 to a ground base line. To now describe the operation of the alarm branch of the control system, during the second time interval the cam switch 22 opens and the cam switches 23 and 24 close. Thus the first resonance peak in the resonance signal is transmitted through an amplifier 25 and an integrator circuit 26 where the first resonance peak is integrated. During the time period of the second resonance peak, the cam switches 23 and 24 are open and cam switches 27 and 28 are closed. The second resonance peak is thus transmitted first through an attenuator 29 which is variable so that the second resonance peak may be attenuated to approximately the same amplitude as the first resonance peak, this attenuated second resonance peak being transmitted through the amplifier 25 and into a second integrator circuit 31 where this second resonance peak is integrated. The outputs from the two integrator circuits 26 and 31 are transmitted to a comparer circuit 32 where the integrated output of the first resonance peak is compared with the integrated output of the second resonance peak. The output of the comparer circuit 32 is a voltage, the amplitude of which is proportional to the amplitude difference between the outputs from the two integrators 26 and 31 and the sign of which is dependent on which of the two outputs is the larger. The output from the comparer is sent to a recorder 33 such as a strip chart recorder on which a continual record is maintained and also to a meter 34 where a visual reading is obtained. If this output from the comparer 32 should exceed a certain value, whether in a negative or positive sense, this difference will serve to trigger off an audible alarm 35 which will indicate to the operator in the process plant that the strict adherence to the relative proportions has not been maintained so that proper corrections may be made in the process. The alarm will also operate if the substance ceases to flow or some other break-down occurs. In addition, separate recorders 26' and 31', such as, for example, strip chart recorders, may be coupled to the outputs from the integrators 26 and 31, respectively, to separately record, for comparison, the two continually integrated resonance signals.

In order to keep the gyromagnetic resonance signal properly centered relative to the time operated cam switches, the second branch circuit is provided to separately integrate each half of the gyromagnetic resonance signal in the third time period. If the second resonance peak is exactly centered in the third period, the integrated halves of this peak will be equal while if the second peak tends to drift slightly off the center point, one integrated signal will be slightly larger than the other. Thus the two integrated halves of this peak may be utilized to maintain a perfect centering of the second resonance peak in the third time interval $T_3$. This is accomplished by means of the cam switches 36 and 37, cam switch 36 operating during the first half of the third time interval while cam switch 37 operates during the second half of the third time interval. Cam switch 36 closes the second peak of the resonance signal through to an integrator 38 during this first half of the time interval and thus, assuming the second peak is exactly centered in the third time interval, the first half of the second resonance peak is integrated. During the second half of the third time interval the second half of the second resonance peak is transmitted through cam switch 37 to integrator 39 where it is integrated. The output from these two integrators 38 and 39 are coupled to a chopper 41, this chopper alternately connecting the outputs from the two integrators through an amplifier 42 and then to a phase detector 43, the phase detector being coupled to the same A.C. source 44 utilized to drive the chopper 41. If the second peak is centered exactly in the third time perod, the output from the phase detector will be zero. If the second resonance peak is not exactly centered, the output from the phase detector 43 is a D.C. signal, the polarity of which depends on the side of the mid-point line M (see Fig. 3) in the third period to which the resonance peak has drifted and the amplitude of which is proportional to the difference between the amplitudes of the two integrated halves. Thus the amplitude indicates the distance that the center of the second resonance peak has drifted from the mid-point line in the third time period. Since the D.C. output of the phase detector 43 possesses a sense and a magnitude dependent on the direction and distance of drift of the resonance signal, this output signal may be utilized to automatically correct for the drifting. In the present instance, the output of the phase detector 43 is transmitted to a magnet control circuit 45 which controls the current flowing through a biasing winding 46 on the magnet 17. The polarizing magnetic field strength may thus be varied to compensate for any drift effects and thus maintain the resonance signal centered at all times. It should be noted that the control signal could be utilized to control the frequency of the transmitter rather than change the polarizing field strength to correct for drift tendencies.

It is also advantageous in the present process control system to directly record the amplitude of each successive first peak of the resonance signals side by side and to also record the amplitude of each successive second peak of the resonance signal side by side in a manner such that the successive resonance peaks may be analyzed over a long period of time. This is accomplished in the present instance by a novel recording system which operates as follows: During the second time period $T_2$ when the first peak of the resonance signal is being produced, cam switch 47 is in its released or unoperated position and connects the output of the receiver 14 through an amplifier and inverter circuit 48 to a continuous recording instrument 49, such as a strip chart recorder. This first resonance peak in the resonance signal is thus amplified and inverted, the amplifier being adjusted so that the amplitude of the first peak is made substantially equal to the amplitude of the second peak of the resonance signal. This amplified and inverted first resonance peak is recorded on the strip chart in such a manner that it extends downwardly from a mid-base line B on the strip recorder (see Fig. 4). During the third time interval $T_3$ the cam switch 47 operates to switch the recorder 49 from the amplifier-inverter 48 directly through to the receiver 14. Therefore, the second resonance peak in the resonance signal is transmitted directly to the recorder 49 and is recorded as a positive pulse extending upwardly from the base line B on the strip chart. The recording of the two peaks is performed in a continuous manner such that all of the first resonance peaks obtained are recorded in a negative direction from the base line and all of the second peaks are recorded in a positive direction from the base line on the strip chart. There is thus produced a continuous plurality of positive peaks all having approximately the same amplitude and an equal plurality of negative peaks all having approximately the same amplitudes and also being approximately the same amplitude as the positive peaks as shown in Fig. 4. Any variations or fluctuations in the envelope of these signals will indicate a deviation from the desired relative proportions of the different nuclei in the chemical substance.

Although the present invention was described as utilized in a crossed coil type of nuclear resonance spectrometer system, it is equally well adapted to single coil or bridge type of gyromagnetic resonance spectrometers.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance spectrometer system, apparatus for automatically controlling the drifting of the gyromagnetic resonance spectrum comprising means for transmitting equal portions in time of the resonance signal on opposite sides of a point in the spectrum at which it is desired that one of the resonance peaks be maintained fixedly centered to separate integrator circuits, one of said integrator circuits integrating the resonance signal in said first portion and the other of said integrator circuits integrating the signal in said second portion, means for comparing the integrated signals from each of said integrator circuits and for producing a signal voltage having an amplitude which is dependent on the difference in amplitudes between the two integrated signals and having a sense which is dependent on which of the two integrated signals is the larger, and means controlled in accordance with the amplitude and sense of said signal voltage for adjusting the gyromagnetic resonance system variables to maintain said one resonance peak centered on said point.

2. Apparatus as claimed in claim 1 wherein said means for comparing the integrated signals and for producing said signal voltage comprises a phase detector coupled to the integrator circuits.

3. In a gyromagnetic resonance spectrometer system, apparatus for automatically controlling the drifting of a gyromagnetic resonance spectrum comprising means for transmitting equal portions in time of the resonance signal on opposite sides of a point in the spectrum at which it is desired that one of the resonance peaks be maintained fixedly centered to separte integrator circuits, one of said integrator circuits integrating the resonance signal in said first portion and the other of said integrator circuits integrating the signal in said second portion, means for producing an alternating current signal, one half cycle of the signal being proportional to the output signal from one of said integrators and the other half cycle of the signal being proportional to the output signal from the other integrator circuit, means for transmitting said alternating signal to a phase detector adapted to produce an output signal voltage which is proportional to the difference between the amplitude of the outputs of the two integrators and the sense of which is dependent on which of the two integrator output signals is the larger, and means controlled in accordance with the amplitude and sense of said signal voltage for adjusting the gyromagnetic resonance system variables to maintain said one resonance peak centered on said point.

4. Apparatus as claimed in claim 3 wherein said means for producing an alternating current signal comprises a chopper circuit, the two contact points of said chopper circuit being coupled to the two output circuits of said integrators, respectively, and the vibrating reed between said two contact points being coupled to the input of said phase detector.

5. In a gyromagnetic resonance spectrometer system including magnet means for producing a polarizing magnetic field to polarize the gyromagnetic atom portions in the sample under investigation and radio frequency means for applying a radio frequency magnetic field to the atom portions at an angle to the polarizing magnetic field and of a frequency value approximately of the Larmor precession frequency of the atom portions in the polarizing magnetic field, means for detecting and amplifying the gyromagnetic resonance signal, means for integrating equal portions in time of the resonance signal on opposite sides of a point in the spectrum at which it is desired that one of the resonance peaks be maintained fixedly centered, means for comparing the integrated signals from each of said equal portions, means for producing a signal voltage having an amplitude which is dependent on the difference in amplitudes between the two integrated signals and having a sense which is dependent on which of the two integrated signals is the larger, and means controlled in accordance with said signal voltage for adjusting the strength of the polarizing magnetic field to compensate for any tendency for the gyromagnetic resonance spectrum to drift.

6. Apparatus for determining the proportions of different gyromagnetic atom portions in a substance comprising gyromagnetic resonance spectrometer means for producing a gyromagnetic resonance spectrum of the substance, said different atom portions producing different resonance peaks in said resonance spectrum, means for varying the amplitude of one or both of said resonance peaks such that the amplitudes of the two peaks are made substantially equal, means for inverting one of said resonance peaks, and means for then transmitting said resonance spectrum signals to an indicator means whereby said inverted resonance peaks are depicted in one direction relative to a base line on the indicator and the other resonance peaks are depicted in the opposite direction from the base line on said indicator.

7. Apparatus as claimed in claim 6 wherein said indicator means comprises a strip chart recorder, successive reproductions of said one resonance peak being recorded on the strip chart on one side of said base line and successive reproductions of said other resonance peak being recorded on said strip chart on the other side of said base line whereby an envelope formed by the tips of said successive recordings of said one peak and the envelope formed by the tips of the successive second resonance peaks will indicate the variations in the proportions of the respective atom portions producing the distinct resonance peaks.

8. Gyromagnetic resonance apparatus for determining the relative proportions of different types of atom portions in the gyromagnetic resonance sample, evidenced by separate resonance peaks in the spectrum comprising switching means for coupling the output of the gyromagnetic resonance system to a recorder, means for operating said switching means in time synchronism with said spectrum, said switching means coupling said resonance peaks to said recorder through inverter means for inverting one of said resonance peaks such that said one resonance peak is recorded on said recorder in a negative direction relative to said first resonance peak.

9. Gyromagnetic resonance apparatus for monitoring a chemical process containing molecular structures comprising means for producing a polarizing magnetic field for polarizing the gyromagnetic atom portions in the process in the direction of the polarizing magnetic field, means for applying a radio frequency magnetic field to the atom portions under investigation of the Larmor frequency of the atom portions in the polarizing magnetic field to cause said atom portions to precess in said polarizing magnetic field at said Larmor frequency, means for detecting the resonance of said atom portions in said field whereby a gyromagnetic resonance spectrum of the chemical substance under investigation is produced having a plurality of resonance peaks therein corresponding to the plurality of different molecular structures in this substance, means for transmitting said resonance peaks to separate integrator circuits, means coupled to the outputs of said separate integrator circuits for comparing the integrated outputs from said integrator circuits, and means coupled to said comparator means operative in response to signals therefrom corresponding to deviations from particular proportions between said integrator outputs for rendering an alarm indicating said deviation.

10. In a gyromagnetic resonance spectrometer system, apparatus for automatically controlling the drifting of the gyromagnetic resonance spectrometer comprising electrical signal measuring means, means for dividing the resonance signal into at least two portions of definite proportions on opposite sides of a point in the spectrum at which it is desired that the spectrum be maintained fixedly centered and transmitting said portions to said signal measuring means wherein said two portions are measured, means for comparing said measured portions and for producing a signal voltage having an amplitude which is dependent on the variations in the relative proportions of said two signal portions and having a sense which is dependent on the direction of variation of the proportions, and means controlled in accordance with the amplitude and sense of said signal voltage for adjusting the gyromagnetic resonance system variables to maintain said spectrum centered on said point.

11. Gyromagnetic resonance apparatus for monitoring a chemical process containing different molecular structures comprising means for producing a polarizing magnetic field for polarizing the gyromagnetic atom portions in the process in the direction of the polarizing magnetic field, means for producing and detecting resonance of said atom portions in said field by applying a radio frequency magnetic field to the atom portions under investigation at the Larmor frequency of the atom portions in the polarizing magnetic field whereby a gyromagnetic resonance spectrum of the chemical substance under investigation is produced having a plurality of resonance peaks therein corresponding to the plurality of different molecular structures in this substance, circuit means for measuring the separate resonance peaks, means coupled to said circuit means for comparing said measured resonance peaks, and means coupled to said comparing means operative in response to signals therefrom corresponding to deviations from particular portions between said resonance peaks for indicating said deviation.

References Cited in the file of this patent
UNITED STATES PATENTS

| 2,386,831 | Wright | Oct. 16, 1945 |
| 2,654,845 | Presenz | Oct. 6, 1953 |
| 2,721,970 | Levinthal | Oct. 25, 1955 |

OTHER REFERENCES

Suryan: "Proc. Indian Academy of Sciences," vol. 33 (1951), pp. 107–111 relied on.
Malling: Electronics, pp. 184–187, April 1953.
Jarrett et al.: Journal of Chemical Physics, vol. 21, pp. 2092, 2093, 1953.

UNITED STATES PATENT OFFICE
CERTIFICATE OF CORRECTION

Patent No. 2,888,638                                                          May 26, 1959

Forrest A. Nelson et al

It is hereby certified that error appears in the printed specification of the above numbered patent requiring correction and that the said Letters Patent should read as corrected below.

Column 7, line 11, after "containing" insert -- different --.

Signed and sealed this 5th day of April 1960.

(SEAL)
Attest:

KARL H. AXLINE                                             ROBERT C. WATSON
Attesting Officer                                       Commissioner of Patents